US008837575B2

(12) United States Patent
Heinrich et al.

(10) Patent No.: US 8,837,575 B2
(45) Date of Patent: Sep. 16, 2014

(54) VIDEO PROCESSING ARCHITECTURE

(75) Inventors: Kenn Heinrich, Oshawa (CA); James Au, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 1283 days.

(21) Appl. No.: 11/693,526

(22) Filed: Mar. 29, 2007

(65) Prior Publication Data
US 2008/0240228 A1 Oct. 2, 2008

(51) Int. Cl.
H04B 1/66 (2006.01)
H04N 19/137 (2014.01)
H04N 19/103 (2014.01)
H04N 19/61 (2014.01)

(52) U.S. Cl.
CPC ... H04N 19/00145 (2013.01); H04N 19/00018 (2013.01); H04N 19/00781 (2013.01)
USPC .......................................... 375/240

(58) Field of Classification Search
CPC H04N 21/4316; H04N 21/8166; H04N 19/00
USPC .......................................... 375/240
See application file for complete search history.

(56) References Cited

U.S. PATENT DOCUMENTS

| 5,142,576 A | 8/1992 | Nadan |
| 5,416,529 A | 5/1995 | Lake |
| 5,557,332 A | 9/1996 | Koyanagi et al. |
| 5,663,724 A | 9/1997 | Westby |
| 5,691,768 A | 11/1997 | Civanlar et al. |
| 5,847,771 A | 12/1998 | Cloutier et al. |
| 5,875,305 A * | 2/1999 | Winter et al. ................. 709/231 |
| 6,285,408 B1 | 9/2001 | Choi et al. |
| 6,369,855 B1 * | 4/2002 | Chauvel et al. ............ 348/423.1 |
| 6,628,702 B1 | 9/2003 | Rowitch et al. |
| 6,887,590 B2 | 5/2005 | Zeizinger et al. |
| 7,409,056 B2 | 8/2008 | LeBlanc et al. |
| 7,436,903 B2 | 10/2008 | Sandhu et al. |

(Continued)

FOREIGN PATENT DOCUMENTS

| EP | 1296520 A | 3/2003 |
| EP | 1 355 499 A2 | 10/2003 |

(Continued)

OTHER PUBLICATIONS

European Office Action dated Dec. 17, 2010 cited in Application No. 08 732 886.0.

(Continued)

*Primary Examiner* — Tamara T Kyle
(74) *Attorney, Agent, or Firm* — Merchant & Gould

(57) ABSTRACT

A video-processing architecture. In a specific embodiment, the architecture includes a first set of modules that accommodate certain functional traffic flowing between each module thereof. A broadcast module broadcasts video traffic to one or more of the first set of modules. In a more specific embodiment, the first set of modules and the broadcast module are configured to facilitate isolation of video traffic from functional traffic. The first set of modules includes plural modules having similar module architecture. The similar module of architecture includes a local memory in each of the plural modules, wherein the local memory stores video data associated with the video traffic. The local, memory includes a first memory bank for storing input pixel data and a second memory bank for storing reconstructed pixel data.

36 Claims, 5 Drawing Sheets

(56) References Cited

U.S. PATENT DOCUMENTS

| | | | |
|---|---|---|---|
| 7,843,998 B2 * | 11/2010 | Bjontegaard | 375/240.23 |
| 7,953,284 B2 | 5/2011 | Au et al. | |
| 8,369,411 B2 | 2/2013 | Au et al. | |
| 8,416,857 B2 | 4/2013 | Au et al. | |
| 8,422,552 B2 | 4/2013 | Au et al. | |
| 2002/0015092 A1 | 2/2002 | Feder et al. | |
| 2002/0021234 A1 | 2/2002 | Yanagiya et al. | |
| 2002/0196853 A1 * | 12/2002 | Liang et al. | 375/240.16 |
| 2003/0138045 A1 | 7/2003 | Murdock et al. | |
| 2005/0094729 A1 * | 5/2005 | Yuan et al. | 375/240.16 |
| 2005/0196051 A1 | 9/2005 | Wong et al. | |
| 2005/0276323 A1 | 12/2005 | Martemyanov et al. | |
| 2006/0088099 A1 | 4/2006 | Gao et al. | |
| 2006/0126726 A1 | 6/2006 | Lin et al. | |
| 2006/0294174 A1 | 12/2006 | Haque et al. | |
| 2007/0009047 A1 | 1/2007 | Shim et al. | |
| 2008/0056350 A1 | 3/2008 | Lyashevsky et al. | |
| 2008/0075376 A1 | 3/2008 | Wilson et al. | |
| 2008/0117965 A1 * | 5/2008 | Vysotsky et al. | 375/240.01 |
| 2008/0162911 A1 | 7/2008 | Vaithianathan | |
| 2008/0240233 A1 | 10/2008 | Au et al. | |
| 2008/0240253 A1 | 10/2008 | Au et al. | |
| 2008/0240254 A1 | 10/2008 | Au et al. | |
| 2008/0240587 A1 | 10/2008 | Au et al. | |
| 2008/0291940 A1 | 11/2008 | LeBlanc et al. | |

FOREIGN PATENT DOCUMENTS

| | | |
|---|---|---|
| WO | WO 0152538 | 7/2001 |
| WO | WO 0152538 A1 * | 7/2001 |
| WO | 2008/039321 | 4/2008 |
| WO | WO 2008/039321 | 4/2008 |
| WO | WO 2008/121662 A2 | 10/2008 |
| WO | WO 2008/121663 A2 | 10/2008 |
| WO | WO 2008/121664 A2 | 10/2008 |
| WO | WO 2008/121664 A3 | 10/2008 |
| WO | WO 2008/121667 A2 | 10/2008 |
| WO | WO 2008/121667 A3 | 10/2008 |
| WO | WO 2008/127855 A1 | 10/2008 |

OTHER PUBLICATIONS

Ron Wilson, "The Right Video Architecture Can Make All the Difference", 10 pages, Aquired at: http://www.edn.com/contents/images/6363920.pdf , 2006.

Mo Li et al., "A High Throughput Binary Arithmetic Coding Engine for H.264/AVC," Solid-State and Integrated Circuit Technology, 2006, 5 pgs.

Hassan Shojania et al., "A VLSI Architecture for High Performance CABAC Encoding," Visual Encoding and Image Processing, 2005, Proc. Of SPIE vol. 5960, 11 pgs.

Hassan Shojania et al., "A High Performance CABAC Encoder," IEEE-NEWCAS Conference, 2005, 4 pgs.

Hendrik Eeckhaut et al., "Optimizing the critical loop in the H.264/AVC CABAC Decoder," Field Programmable Technology, 2006, pp. 113-118.

Lingfeng Li et al., "A CABAC Encoding Core with Dynamic Pipeline for H.264/AVC Mail Profile," Circuits and Systems, 2006, pp. 760-763.

Detlev Marpe et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 621-636.

Wonjae Lee et al., "Pipelined Intra Prediction Using Shuffled Encoding Order for H.264/AVC," Tencon, 2006, IEEE Region Conference, 4 pgs.

Kazushi Sato et al., "Consideration on Intra Prediction for Pipeline Processing in H.264/MPEG-4 AVC," Applications of Digital Image Processing XXVII, Proceedings of SPIE, vol. 5558, 2004, pp. 485-494.

Yu-Wen Huang et al., "Hardware Architecture Design for H.264/AVC Intra Frame Coder," Circuits and Systems, 2004, pp. 269-272.

Jian-Wen Chen et al., "Introduction to H.264 Advanced Video Coding," Design Automation, Asia and South Pacific Conference on Jan. 24, 2006, pp. 736-741.

International Search Report dated Dec. 3, 2008 cited in Application No. PCT/US2008/058349.

International Search Report dated Nov. 10, 2008 cited in Application No. PCT/US2008/058335.

International Search Report dated Nov. 14, 2008 cited in Application No. PCT/US2008/058334.

International Preliminary Report dated Sep. 29, 2009 cited in Application No. PCT/US2008/058334.

European Office Action dated Feb. 11, 2010 cited in Application No. 08 732 886.0.

European Office Action dated Feb. 25, 2010 cited in Application No. 08 780 490.2.

European Office Action dated Mar. 18, 2010 cited in Application No. 08 744 419.6.

European Office Action dated Mar. 18, 2010 cited in Application No. 08 732 889.4.

U.S. Office Action dated Jul. 23, 2010 cited in U.S. Appl. No. 11/693,439.

U.S. Final Office Action dated Oct. 18, 2010 cited in U.S. Appl. No. 11/693,439.

Canadian Office Action dated Jul. 4, 2011 cited in Application No. 2,682,590.

European Office Action dated Nov. 3, 2011 cited in Application No. 08 732 886.0, 6 pgs.

U.S. Office Action dated Jun. 16, 2011 cited in U.S. Appl. No. 11/693,567.

U.S. Office Action dated Jun. 16, 2011 cited in U.S. Appl. No. 11/693,473.

Genhua Jin et al., "A Parallel and Pipelined Execution of H.264/AVC Intra Prediction," Proceedings of the Sixth IEEE International Conference on Computer and Information Technology, 2006, 6 pgs.

U.S. Office Action dated Jun. 27, 2011 cited in U.S. Appl. No. 11/693,506.

European Office Action dated Oct. 14, 2013 cited in Application No. 08 744 421.2, 9 pgs.

European Office Action dated May 29, 2012 cited in Application No. 08 732 886.0, 7 pgs.

Canadian Office Action dated Jun. 4, 2012 cited in Application No. 2,682,590, 2 pgs.

Canadian Office Action dated Jun. 21, 2012 cited in Application No. 2,682,461, 4 pgs.

Canadian Office Action dated Sep. 18, 2013 cited in Application No. 2,682,315, 3 pgs.

European Office Action dated Feb. 13, 2013 cited in Application No. 08 780 490.2—1908, 5 pgs.

European Office Action dated Feb. 25, 2013 cited in Application No. 08 744 419.6—1908, 4 pgs.

Canadian Office Action dated Jan. 5, 2012 cited in Application No. 2,682,461, 3 pgs.

Canadian Office Action dated Jan. 11, 2012 cited in Application No. 2,682,449, 3 pgs.

U.S. Final Office Action dated Dec. 14, 2011 cited in U.S. Appl. No. 11/693,473, 25 pgs.

U.S. Final Office Action dated Dec. 29, 2011 cited in U.S. Appl. No. 11/693,567, 19 pgs.

U.S. Final Office Action dated Jan. 4, 2012 cited in U.S. Appl. No. 11/693,506, 19 pgs.

Canadian Office Action dated Apr. 5, 2013 cited in Application No. 2,682,436, 3 pgs.

European Office Action dated Apr. 17, 2013 cited in Application No. 08 744 419.6—1908, 5 pgs.

European Office Action dated May 21, 2013 cited in Application No. 08 732 886.0—1906, 9 pgs.

European Office Action dated Nov. 26, 2013 cited in Application No. 08 780 490.2, 4 pgs.

Canadian Office Action dated May 7, 2012 cited in Application No. 2,682,315, 3 pgs.

Canadian Office Action dated Feb. 27, 2013 cited in Application No. 2,682,315, 2 pgs.

Canadian Office Action dated Mar. 26, 2012 cited in Application No. 2,682,436, 2 pgs.

* cited by examiner

VIDEO PROCESSING ARCHITECTURE

BACKGROUND OF THE INVENTION

This disclosure relates generally to video processing and more specifically relates to video processing system architectures. Video processing systems are employed in various demanding applications, including high-definition television, missile guidance systems, and Internet video streaming. Such applications often demand compact cost-effective systems for encoding, transmitting, and decoding high quality compressed video relatively accurately, quickly; and efficiently.

Standards such as H.264 define specific ways of doing video encoding and decoding. H.264 is a digital video codec standard written by the Joint Video Team (JVT) comprising the International Telecommunication Union (ITU)—Telecommunication Standardization Sector (T) and the International Organization for Standardization (ISO)/International Electrotechnical Commission (IEC) Moving Picture Experts. Group (MPEG). The H.264 standard is also called the ISO/TEC MPEG-4 Part 10 standard or the ITU-T H.264 standard.

An example H.264 video encoder architecture includes various physical modules, such as motion search, mode decision, reconstruction, and loop-filtering modules. Each module must often, access large amounts of video information. Unfortunately, conventional encoder architectures typically exhibit undesirable: design constraints that result in inefficient data transfer operations between encoder modules. These inefficiencies complicate efforts to achieve high-quality video output.

DETAILED DESCRIPTION OF EXAMPLE EMBODIMENTS

Figure 1:
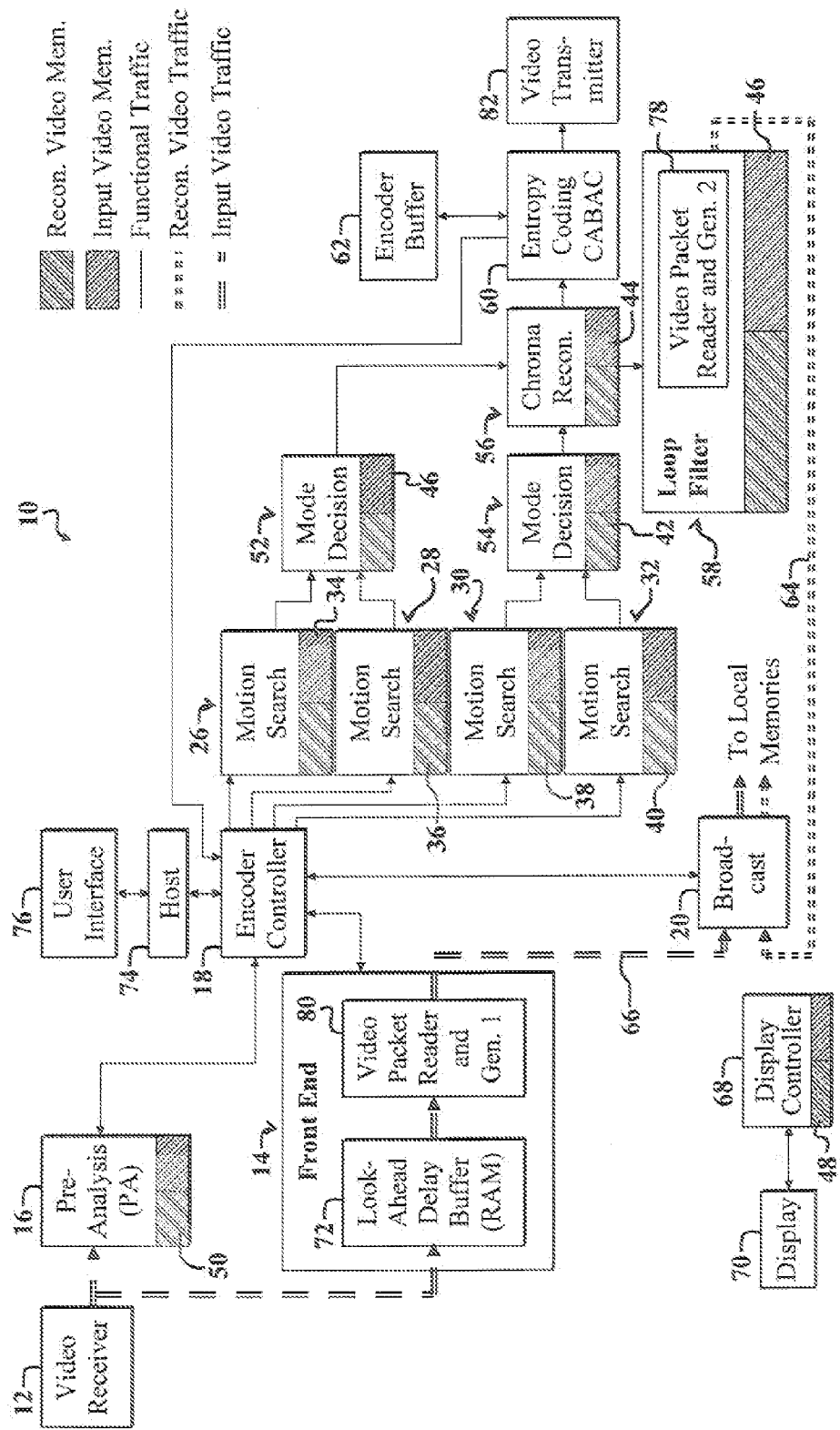
FIG. 1 illustrates an example video-processing architecture.

An example video-processing architecture includes a first set of modules that accommodate certain functional traffic Sowing between each module thereof. A broadcast module broadcasts video traffic to one or more of the first set of modules. Functional traffic may be any flow of data affecting the function or operation of a module.

In a more specific embodiment, the first set of modules and the broadcast module facilitate separating video traffic from functional traffic. The first set of modules includes plural, modules with similar module architecture. The similar module architecture includes a local memory in each of the plural modules, wherein the local memory stores video data associated with the video traffic. The local memory Includes a first memory bank for storing input pixel data and a second memory bank for storing reconstructed pixel data. For the purposes of the present discussion, reconstructed pixel data may be any pixel information or video data that, has experienced an Inverse of a first process after having experienced the first process. For example, pixel data that has been decompressed alter having been compressed may be considered to be a type of reconstructed pixel data.

The similar module architecture further includes a processing engine for receiving functional data pertaining to the functional traffic and performing an operation on video data associated with the video traffic based on the functional data. A similar packet definition is employed for video traffic broadcast to the plural modules.

Use of this embodiment or related embodiments may help to free interface bandwidth between modules that would otherwise be burdened with video traffic. In addition, use of similar modules in the architecture facilitates design reuse, which may reduce development costs associated with implementing video processing systems according to the architectures disclosed herein, as discussed more fully below.

Certain embodiments disclosed herein or variations thereof may facilitate the distribution of video pixels between devices in a video processing circuit, such as an H.264-compliant encoder, that includes multiple Field Programmable Gate Arrays (FPGAs). A significant portion of the data transfer bandwidth in FPGA Implementations of video processing circuits is often allocated to the transfer and management of video pixel information between FPGA devices, One architecture disclosed herein employs a broadcast network configuration with a common video pixel memory in communication with local memories associated with various FPGA modules in the architecture. This architecture facilitates distributing the video pixel data between devices using a broadcast (one-point to many-points) network configuration with a common video pixel memory that communicates with the local memories, which may store locally store video pixels distributed thereto. This, architecture may allow video pixels to be distributed within a single slice encoder that includes modular processes, such as motion search, mode decision, and reconstruction processes. Each corresponding module includes or is otherwise coupled to a local memory for storing the video received by the broadcast.

By relieving data traffic congestion between modules using architectures disclosed herein or modifications thereof, improved processing speeds are achievable. The resulting improved processing speeds may facilitate single-slice encoding and exhaustive motion search operations, which may yield superior video quality. A single-slice encoder may be any encoder that encodes a picture as a video slice or other single compressed data unit.

In addition, certain architectures disclosed herein may further simplify the design of associated video processing circuits by standardizing or modularizing one or more common functions. Certain architectures may reduce product development time by facilitating design reuse, allowing design engineers to concentrate more effectively on processing functions rather than infrastructure.

While certain embodiments are discussed herein with respect to an encoder, those skilled in the art may readily adapt certain embodiments herein to a decoder or other video-processing apparatus without departing from the scope of the present teachings and without undue experimentation.

For clarity, various well-known components, such as power supplies, H.264 decoders, computer systems, daughtercards, audio encoders, hosts, user interfaces, scaling circuits, timing clocks, and so on, have been omitted from the figures. However, those skilled in the art with access to the present teachings will know which components to implement and how to implement them to meet the needs of a given application.

A particular embodiment of the invention is discussed with respect to an implementation of an H.264-compliant system, i.e., a system that produces performs processing or otherwise produces outputs that comply with one or more H.264 standards. However, it should be apparent that aspects of the invention may be used to implement different standards or may he used in association in any other suitable data processing application. Nothing in the H.264 specifications should be construed as limiting the scope of the invention unless so noted. Many of the same terms that appear in the H.264 specification are used in the present specification, but these terms are intended to have different meanings. For example, a video processing architecture may be any assembly of components or a design for the assembly of components, wherein one or more components of the assembly are capable of processing video data. An example video processing architecture is a video encoder architecture specifying that certain modules in the encoder have local memories that are fed from a central memory, and wherein two or more of the certain modules are positioned to intercommunicate. Video data may be any information, such as pixels, brightness information, color information, and so on, relating to or affecting the processing of one or more frames of data. A frame of data may be any collection of data, such as data bits comprising an image.

FIG. 1 illustrates an example video-processing architecture 10. In the present example embodiment, the video-processing architecture 10 is employed to implement a video encoder. The video encoder 10 includes a video receiver 12 that receives video data and provides video input to an encoder front end 14 and to a pre-analysis module 16. The pre-analysis module 16 is coupled to an encoder controller 18. The controller 18 is coupled to a host module 74, a broadcast module 20, an entropy-coding module 60, the front end 20 and motion-search modules 26-32. The controller 18 may be coupled to more or fewer modules in the encoder 10 without departing from the scope of the present teachings.

A first motion-search module 26 and a second motion-search module 28 are coupled to a first mode-decision module 52. A third motion-search module 30 and a fourth motion-search module 32 are coupled to a second mode-decision module 54. The mode-decision modules 52, 54 are coupled to a chroma-reconstruction module 56. The chroma-reconstruction module 56 is coupled to a loop filter 58 and the entropy-coding module 60. The entropy-coding module 60 is coupled to a video transmitter 82 and to an encoder buffer 62, which acts as a temporary storage for bits to be output from the entropy-coding module 60. The entropy-coding module 60 provides feedback, such as encoder rate-control feedback, to the controller 18. The loop filter 58 provides reconstructed video data 64 to the broadcast module 20. The broadcast module 20 receives input video data from the front end 14 and broadcasts data to the local memories 34-50 of various modules, including a local memory 48 of a display controller 68, which is coupled to a video display 70.

Various modules, including the motion-search, modules 26-32, mode-decision modules 52, 54, pixel-reconstruction module 56, loop filter 58, display controller 68, and the pre-analysis module 16 include local memories 34-50, respectively. Such modules exhibit, similar architectures and may be implemented via one or more daughtercards, as discussed more fully below. The local memories 34-50 are adapted to receive and store input video data and reconstructed video data that is broadcast from the broadcast module 20 as needed by the accompanying modules 16, 26-32, 52-58, 68.

For the purposes of the present discussion, a local memory of a particular module may be any memory that is dedicated to, included in, or otherwise relatively close to the particular module. In the examples herein, local memories are included in the particular modules to which they are dedicated. The term "broadcast" may mean to disseminate or distribute to entities, where entities may include, one or more modules, video-processing functions, programs, sets of instructions, and so on. A module may be any device, function, set of instructions, or other entity that is adapted to perform a predetermined function or purpose.

In operation, the front end 14 receives input video data, which is temporarily held in a look-ahead delay buffer 72. A first video packet reader and generator 80 is coupled to the look-ahead delay buffer 72 and facilitates providing input video data to the broadcast module 20.

The pre-analysis module 16 analyzes input video received from the video receiver 12 and provides video analysis results to the controller 18. The video analysis results may include picture complexity information- buffer bit levels, and so on.

The controller 16 employs the video analysis results, along with bit-production feedback from the entropy-coding module 60 pertaining to a previous frame, to facilitate controlling the operation of various modules of the encoder 10. For example, the controller 18 may facilitate controlling quantization parameters used by the mode decision modules 52, 54 based on the current bit rate of the entropy-coding module 60. In the present specific embodiment, the entropy-coding module 60 is implemented via a Context Adaptive Binary Arithmetic Coding (CABAC) module 60 that produces outputs that are compliant with H.264 standards, such as H.264 main and high profiles. The controller 18 may also employ the output bit information from, the entropy-coding module 60 to facilitate controlling the data rate of the encoder 10. An example of documentation that provides details of the H.264 standard is ISO/IEC 14496-10 (ITU-T H.264), International Standard (2005), Advanced video coding for generic audiovisual services; which, is hereby incorporated by reference as if set forth in full in this specification for all purposes, The entropy-coding module 60 outputs an H.264 compliant bitstream that may incorporate video prediction information and residuals. Residuals may be coefficients or other data representative of the difference between two or more frames of data.

The controller 18 provides functional inputs, also called coding data, to various modules, including the motion-search modules 26-32. The motion-search modules 26-32 are adapted to perform prediction operations via motion search and intra search operations.

For the purposes of the present discussion, the term "motion search" may be a process of finding certain desired motion vectors for a given video frame or portion thereof. Exhaustive motion search may involve testing all possible motion representations to determine preferred motion vectors, where the degree of preference is based on one or more predetermined criteria. The term's "exhaustive motion search" and "full search" are employed interchangeably herein. A motion search module may be any module capable of performing a motion-search or a motion-compensation operation pertaining to a video frame. A motion-compensation or motion-search operation may be any operation or calculation wherein one or more factors pertaining to interframe changes m a frame are incorporated into the operation or calculation.

A functional input may be any input affecting the operation of a module. Examples of functional inputs include control inputs, mode-decision information, and so on. Similarly, functional output may he any information output from a first module that may affect the operation of a second module, or otherwise describes the operation of the first module.

In the present example embodiment, the motion-search modules 26-32 provide certain intra-prediction results to the mode-decision modules 52, 54. The mode-decision modules 52, 54 are adapted to select a prediction mode for each macroblock of an image frame. A macroblock may be any grouping of pixels, such as a 16×16 grouping of pixels as defined, in one or more H.264 standards. The term "mode decision" may refer to a process of finding a desired operational mode for coding input data based on one or more predetermined criteria, The mode-decision modules 52, 54 may not only perform standard mode decision, but intra-block mode decision, and so on, to facilitate implementing motion compensation and/or intra compensation to reconstruct pixel luminance information and to output residual data as needed. To facilitate implementing motion compensation and/or intra compensation, the mode-decision modules 52, 54 may further include instructions and/or modules for performing transformations (such as by using Modified Discrete Cosine Transforms (MDCTs) or other transforms), forward and reverse quantization, and so on, for luminance data in a given image frame. The residuals output by the mode-decision modules 52, 54 may include various coefficients associated with luma data.

The chroma-reconstruction module 44 may include instructions for performing intra prediction for chrominance if required for a given implementation. The chroma-reconstruction module 44 may implement motion compensation and/or intra compensation, transformation, forward and inverse quantization, and so on, to output residuals representative of reconstructed pixel chroma information.

The loop filter 58 may act as a deblocking filter to remove blocking artifacts in reconstructed pixels before the pixels are forwarded to the broadcast module 20 as reconstructed pixel information. The loop filter 58 includes a second video packet reader and generator 78 for facilitating generating video line packets based on residuals. The video line packets-are then transmitted to the broadcast module 20 as reconstructed pixel, information.

For the purposes of the present discussion, pixel information may be any data describing a portion of an image. Example pixel Information includes chroma and luma values associated with a dot, pixel, or other sub-portion of a video frame. Luma pixel data or information may be any information pertaining to brightness or to an achromatic portion of an image or video frame. Chroma pixel data or information may be any color information pertaining to an image or video frame.

The broadcast module 20 broadcasts video traffic to the various modules 16, 26-32, 52-58, 68. The video traffic may include input video date and reconstructed pixel information, also called reconstructed video data. The corresponding video data is stored in the local memories 34-50 for use by the associated modules 16, 26-32, 52-58, 68.

The entropy-coding module 60 receives residual data, including quantisation coefficients for video frames, output from the chroma-reconstruction module 56. The resulting residual data is entropy-encoded via CABAC methods before the resulting compressed data is forwarded to the video transmitter 82. The video transmitter 82 may then transmit resulting compressed video information as needed for a given implementation.

The user interface 76 employs the host 74 to Interface with the controller 18, which may be implemented via, a Digital. Signal Processor (DSP). A user may employ the user interface 76 to facilitate adjusting the operation of the encoder 10 by adjusting certain parameters associated with the controller 18.

The display controller 68 interfaces the display 70 with the broadcast module 20 to facilitate providing video data to the display 70. A user may view the display 70 to observe reconstructed pictures output by the loop filter 58 and/or the front end 14.

Note that a conventional H.264 encoder typically lacks the broadcast module 20 an lacks the various local memories 34-50. In such an encoder, video traffic and control traffic are transferred between each, module. The extra video traffic transferred between each module burdens the interfaces between modules. Consequently, such interfaces typically had to have extra bandwidth, which was costly. Furthermore, system design constraints often limited the bandwidth between modules. Consequently, encoder speed and per to nuance was often compromised.

In the present architecture, coding data and video traffic are separated. Coding traffic is allowed to flow between various modules, such as the modules 16, 26-32, 52-58, 68, via interlaces between the modules. Video traffic requiring significant bandwidth Is delivered to the modules 16, 26-32, 52-58, 68 from the broadcast module 20 instead of via interfaces between the modules 16, 26-32, 52-58, 68. This relieves inter-module bandwidth constraints, which may greatly enhance encoder performance. The broadcast module 20 acts as a common video memory, also called a central video memory, that may populate the local memories 34-50 as needed. In the present example embodiment, the broadcast module 20 may broadcast to each local memory 34-50 a superset of the video information that is needed by each module corresponding 26-32, 54-58, 68, 16. The corresponding modules or engines 26-32, 54-58, 68, 16 may then select needed video information from the superset of broadcast video that is needed for particular operations. The selected video information may be replicated as needed by the modules 26-32, 54-58, 68, 16 and stored in the local memories 34-50.

For the purposes of the present discussion, coding traffic may be any flow of data affecting the function or operation of a module. For example, coding traffic may include control signals, instructions, and/or other data to establish a state or operational mode of a module. The terms "coding traffic" and "functional traffic" are employed interchangeably herein. Similarly, the terms "coding data" and "functional data" may be employed interchangeably to mean any information affecting the function or operation of an entity. An example of coding data includes control signaling between the controller 18 and the various modules 14, 16, 20, 26-32, 74 coupled thereto.

Video data traffic may be any flow of data, wherein the data includes descriptive information, such as color or brightness information, or other pixel values pertaining to an image or video frame. Note that certain types of video traffic may he used as coding traffic or control traffic and vice versa without departing from the scope of the present teachings. Video data may be any information pertaining to pixel values of an image or video frame.

A frame may be any set of data that includes plural pixels of Information, where a pixel may be a value associated with a data point or other basic element or unit of an image or frame. An image frame may be any collection of data points or pixels that are associated with an image or something to be displayed or viewed. An image may be any thing or representation of a thing that can be viewed. A slice of an image frame may be any grouping of macroblocks for processing purposes.

Note that various modules employed in the encoder 10 may be omitted or otherwise replaced with other types of modules without departing from the scope of the present teachings. Furthermore, while the present embodiment is discussed with respect to a H.264 video encoder, other types of video processing systems may employ an architecture as described herein without departing from the scope of the present teachings. For example, various types of video processing systems, such as a video decoder, may benefit from an architecture wherein certain portions of inter-module traffic are separated so that one portion Is transferred between modules while another portion is broadcast to the modules.

Certain modules in a given video processing system may require video input, reconstructed video, or both, to perform computations. For example. In the present embodiment, the pre-analysis module 16 uses input frames. The motion-search modules 26-32 use both input and reconstructed frames. The mode decision modules 52, 54 use both input and reconstructed video to facilitate producing residuals, and use input video to perform intra mode coding. The chroma-reconstruction module 44 reconstruction uses input video and reconstructed pixels from a previous frame, and so on.

Because fee data transfer bandwidth required between modules to send this video data is relatively large, use of central distribution and local storage of both input video and reconstructed frames to each major functional block in the encoder 10, as disclosed herein, may greatly relieve inter-module bandwidth problems. The video broadcast module 20 is shown acting as a one to many distributor of the input and reconstructed pixel information or other video data to each module of the encoder 10.

Hence, the architecture employed by the encoder 10 allows a common set of video interface logic blocks to be designed to handle various video input and reconstruction tasks. The architecture further facilitates freeing up much of the data transfer bandwidth between PPGAs used to implement various modules, which facilitates the transfer of intermediate coding computation results between modules.

The input and reconstructed frames associated with the video data are mapped to local memory via a memory map that is similar or Identical for each module of the encoder 10. Such module architectural similarities are shared-across various FPGAs used to implement the modules, as discussed more fully below. This facilitates design reuse. Furthermore, video information broadcast via the broadcast module 20 includes packets that are characterized by a standard format that is readable by the associated modules 16, 26-32, 52-58, 68. The term "standard format" may be any format that is readable by multiple modules of a system. The term "standard format" or "common format" does not suggest that the format is necessarily a well known, format or part of any official standard. Similarly, a standard packet may be any packet that is encoded in or otherwise exhibits a standard format. Standard packets may have similar or identical formats, The broadcast module 20, which represents a central distribution point, sends video to be coded to various modules 16, 26-32, 52-58, 68 in the encoder 10 in a desired order just prior to coding. Each, module 16,26-32, 52-58,68 is; allocated enough local memory storage to handle storage of several reference frames. However, the front end 14 may include a relatively large amount of Random Access Memory (RAM) to implement the look-ahead delay buffer 72.

Figure 2:
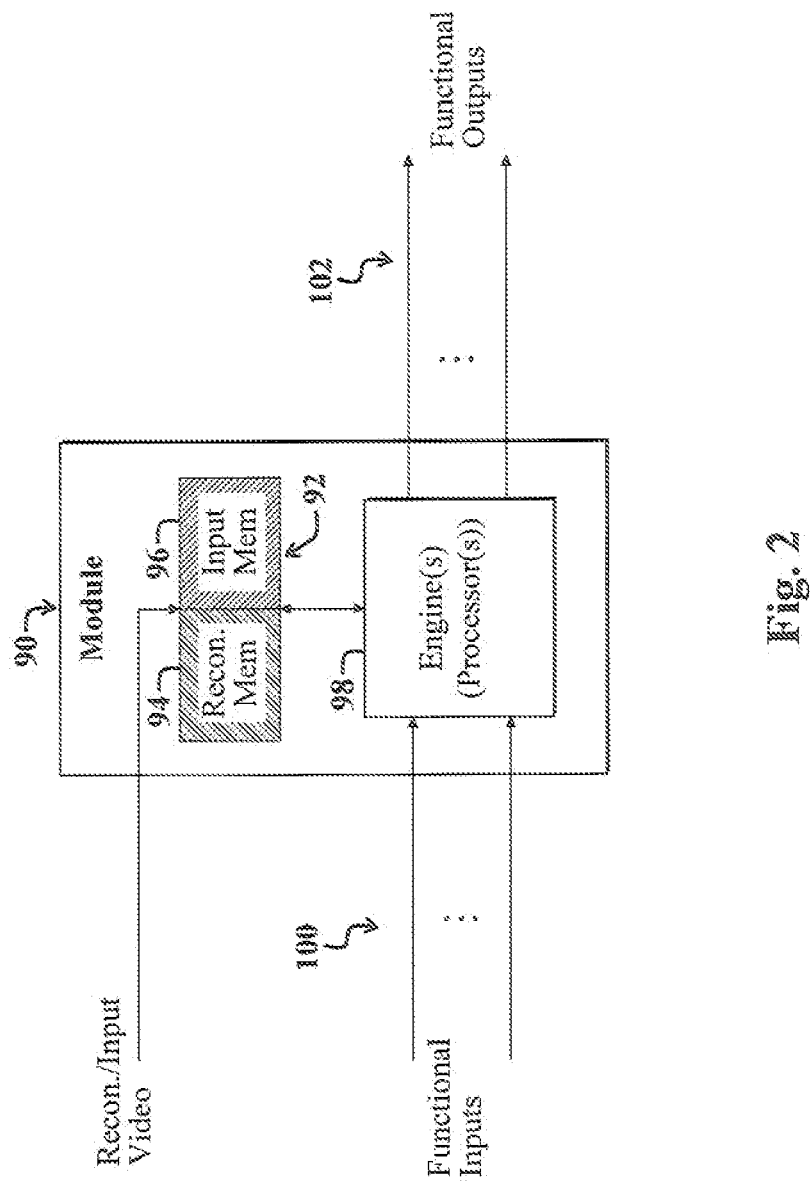
FIG. 2 illustrates an example architecture of a module of the video-processing architecture of FIG. 1.

FIG. 2 illustrates an example architecture 90 of a module of the video-processing architecture 10 of FIG. 1. The architecture 90 includes a local memory 92 that includes a first memory bank 94 for storing reconstructed pixel information, and a second memory bank 96 for storing input pixel information pertaining to input video data. The local memory 92 is accessible by engines 98, which may include processors, memory controllers, and so on. The engines 98 receive functional inputs 100; retrieve video data from the local memory 92 as needed to perform computations in accordance with the functional outputs; and then provide resulting functional outputs 102. The functional outputs 102 may be used as functional Inputs for a subsequent module.

For the purposes of the present discussion, an engine may be any processor, processor coupled to a memory, computer, or other device capable of processing information.

The module architecture 90 represents a shared, also called common or standard, architecture that is employed to implement various modules 16, 26-32, 52-58, 68 of FIG. 1. Each module has a common input for reconstructed and input video, in addition to functional inputs and outputs.

Figure 3:
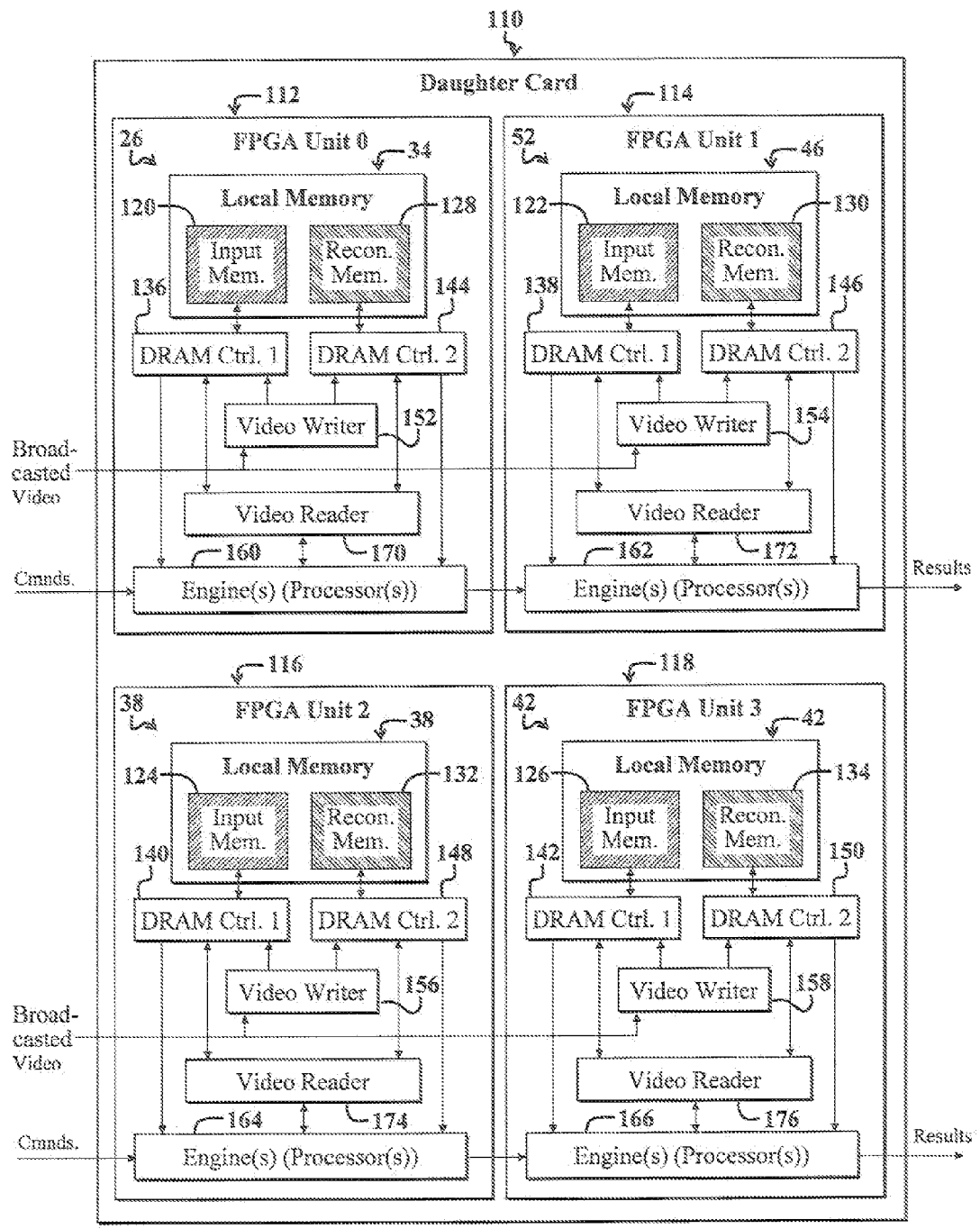
FIG. 3 is a more detailed diagram illustrating an example daughtercard for implementing certain modules of the video-processing architecture of FIG. 1.

FIG. 3 is a more detailed diagram illustrating an example quad FPGA daughtercard 110 for implementing certain modules of the video-processing architecture 10 of FIG. 1. For illustrative purposes, the daughtercard 110 includes, four FPGA units 112, 114, 116, 118, also simply called FPGAs, which represent the first motion-search module 26, the first mode-decision module 52, the third motion-search module 30, and the second mode-decision module 54 or FIG. 1, respectively. In the present example embodiment, the local memories 34, 46, 38, 42 are shown positioned on the FPGA units 112-118. However, such memories may be positioned elsewhere, such as indifferent locations on the daughtercard 110, which are not on the corresponding FPGA units 112-118.

Each FPGA 112-118 includes a corresponding local memory 34, 46, 38, 42, each having a first memory hank 120-126 for storing input video frames and a second memory bank 128-134 for storing reconstructed video frames. The input-frame local memory banks 120-126 communicate with a first set of Dynamic Random Access Memory (DRAM) controllers 136-142, respectively. The reconstracted-frame local memory banks 128-134 communicate with a second set of DRAM controllers 144-150, respectively. Each FPGA 112-118 includes a video writer 152-158, which facilitates writing input and reconstructed video data to the local memories 34, 46, 38, 42 via the DRAM controllers 136-150.

Each FPGA 112-118 further includes engines 160-166 for processing video data from the local memories 34, 46, 38, 42 based on received processing commands or other coding input. Video readers 170-176 may interface the engines 160-166 with the DRAM controllers 136-150 to facilitate reading video data, from the local memories 34, 46, 38, 42. Alternatively, the video readers 170-176 may be omitted. For example, requisite video reading functionality may be built into the engines 160-166, or alternatively, the DRAM controllers 136-150 may push data to the engines 160-166 without receiving a request from a reader.

Note that the DRAM controllers 136-150, video writers 152-158, and video readers 170-176, and so on, may he considered as part of the engines 160-166, without departing from, the scope of the present teachings. In this case, the architectures of the modules 26, 52, 38, 42 are similar to the architecture 90 of FIG. 2.

In the quad FPGA daughtercard 110, the FPGAs 112-118 are grouped in pairs, where each pair (112, 114 and 116, 118) includes a first pair of FPGAs 112, 116 and a second pair of FPGAs 114, 118. The first FPGA of each pair, i.e., FPGAs 112, 116, may relay video and/or control data to the second FPGA of each pair, i.e., FPGAs 116, 118, as shown in FIG. 3.

The DRAM control 136-150, video writer 152-158, and video reader 170-176 modules are common across FPGAs 112-118. Each module 26, 52, 38, 42, is implemented via a corresponding FPGA 112-118, respectively. In the present example embodiment, a set of modular daughtercards with either 3 or 4 FPGA modules with, the memory and distribution interfaces as specified are employed to facilitate implementing the encoder 10 of FIG. 1.

By appropriately coupling FPGAs, it is possible to employ several FPGAs to implement a given module, such that multiple constituent FPGAs act together as if they were a single module, such as the module 90 of FIG. 2.

Note that multiple daughtercards, such as the daughtercard 110 of FIG. 3, may be employed to facilitate implementing the encoder 10 of FIG. 1. With reference to FIGS. 1 and 3, video data may be transmitted to each daughtercard from the broadcast module 20 on a single link.

The video broadcast module 20 broadcasts video packets in a standard format, where the term "standard" may mean commonly used or shared among modules or components in an accompanying system or other entity, such as the encoder 10 of FIG. 1. Hence, a standard format may be a packet format that is commonly used by two or more modules or entities. The standard format generally refers to a packet's payload format but other aspects of the packet, such as header or appended information, can also be part of the standard format Although specific details of a packet format are provided herein, other embodiments may deviate from these details while still achieving a standard format for that embodiment. For example, payload content does not have to be line based or use separate luminance/chrominance data. Content can be directed to blocks, rectangles, or other image areas. Separate or mixed luminance/chrominance or other image characteristic data can be used.

Each FPGA used to implement a given module of the architecture 10 of FIG. 1 may contain one or more standard modules for reading video packets from memory and/or receiving video packets and storing them in memory via a standard memory controller. The term "standard" does not imply feat the modules are implemented via a well known, or conventional industry format.

Figure 4:
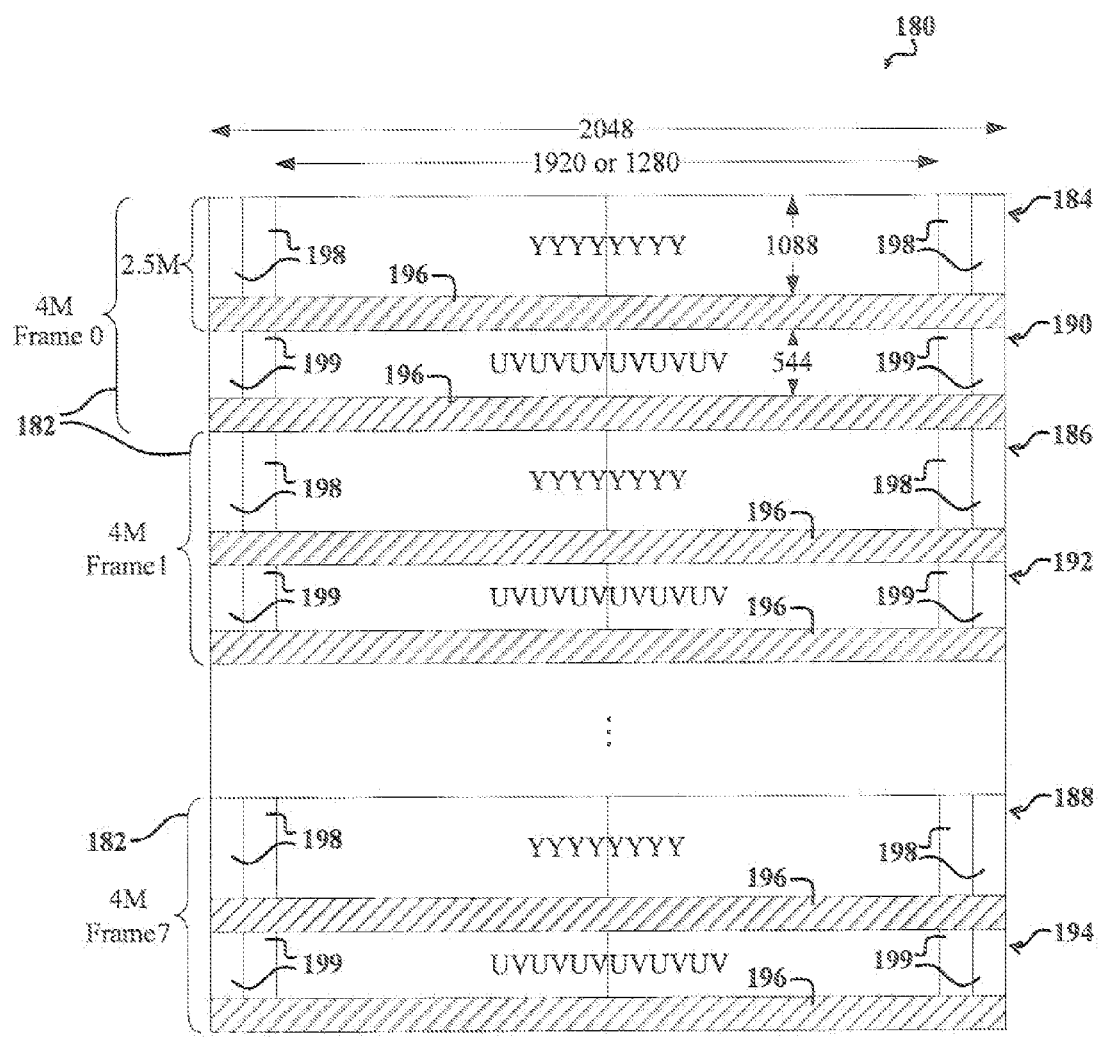
FIG. 4 is an example memory map illustrating how frames of video data are mapped to memories of the modules of FIGS. 1-3.

FIG. 4 is an example memory map 180 illustrating how frames 182 of video data are mapped to local memories 34-50 of various modules of FIGS. 1-3. The frames 182 include lama data 184-188 and chroma data 190-194.

For consistency, video stored in memory uses the memory map 180 shown, in FIG. 4. Bach frame 182 is allocated approximately four megabytes of memory space, which is aligned on $2^{22}$-byte (4,194,304-byte) boundaries. Luma pixel data 184-188 and chroma pixel, data 190-194 are partitioned in raster lines, where each raster line is up to 2048 bytes long. Raster lines In the present embodiment are confined within 2048-byte boundaries, i.e., boundaries that are separated by 2048 bytes. The first 1280 (500 hexadecimal) lines in a four megabyte memory page are used to hold luma data. Often, only the first 1088 bytes will be used to hold luma data. The remaining 768 (300 hexadecimal) bytes are used for chroma data. Chroma data 190-194 is stored as byte-interleaved UV, where U and V represent chroma color components of a pixel Y in FIG. 4 represents a luma or brightness component of a pixel.

The luma data 184-188 includes 32-pixel extensions 198 on opposite ends of the associated raster line. The chroma data 190-194 includes 16 pairs of U and V pixels in extensions 199 that are positioned on opposite ends of the associated raster line, Certain frames may not occupy the entire allotted four, megabytes of memory space. Unused memory 196 may separate luma and chroma pixel data and may occur between frames 182.

Figure 5:
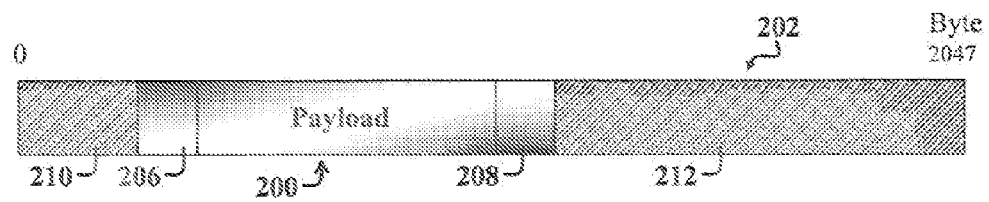
FIG. 5 illustrates an example packet used to encode a video raster line.

FIG. 5 illustrates an example packet 200 used to encode a video raster line 202. The packet 200 includes a pay load 204 of pixel data positioned between a left extension (Lrepeat) 206 and a right extension (Rrepeat) 208. The left extension 206 is a portion of the pixel 200 that includes a repeated version of the leftmost portion of the pixel payload 204. Similarly, the right extension 208 includes a repeated version of the rightmost portion of the pixel pay load 204. In the present example embodiment, a left portion 210 and a right portion 212 of the raster line 20.2 represent pixels or pixel memory spaces that were not written when the packet 200 was executed. A packet is executed when information representative of the packet is written to a portion of memory associated with the raster hoe 202.

The video encoder architecture of FIG. 1 employs various video packet types, including luma reconstruction, chroma reconstruction, luma input, and chroma input packets. These packet types have similar structures with the exception that luma and chroma packets may employ slightly different line numbering and pixel extensions. Furthermore, input packets and reconstruction packets are sent to different memory banks, i.e., input-frame local memory banks 120-126 and reconstruction-frame local memory banks 128-134 of FIG. 3, respectively.

Note that in certain video encoder implementations, an encoder controller may instruct motion vectors to reference pixel data outside an edge of a video frame, also called a picture. A vector may reference pixel data outside of an active video frame if a portion of the motion compensated macroblock associated with the vector is within the boundaries of the video frame.

Accordingly, to provide well defined behavior in eases wherein motion vectors reference pixels outside of a picture boundary, left and right pixel replication is employed. Left and right pixel replication involves storing extra pixels, such as pixels corresponding to the kit extension 206 and the right extension 208, on each raster line in memory. To implement pixel replication for portions at the top and bottom of a picture, the associated memory controller re-reads certain raster lines as needed.

Re-reading raster lines to achieve desired pixel replication to accommodate certain motion vectors is particularly useful when a given field or frame is not-fixed and when a value associated with a replicated line of pixels is not fixed. Note that the value of a replicated line of pixels may depend on the picture coding structure being used at a given time.

Top and bottom pixel replication could require up to 21 pixels (including 15 pixels for macroblock extension and 6 pixels for sub-pixel interpolation) at each edge.

To allow the left and right pixel replication, to be signaled to the memory writer, such as one of the memory writers 152-158 of FIG. 3, without requiring extra bandwidth for transmitting extra pixels on each side, a count is transmitted to the associated memory writer. The count indicates how replication will occur for a given operation, if at all.

Generally, a packet, such as the packet 200, contains the pixel payload, left and right repeat counts 206, 208, and an offset, which affects the position, also called offset, of the packet 200 in the raster line 202.

The packet 200 may be executed by a video writer engine, such as one of the video writers 152-158 of FIG. 3. Packet execution results in modifying memory in one luma or one chroma raster line of either input-frame memories or reconstruction-frame memories.

In the present embodiment, packets, such as the packet 202, including header data and payload data, are shorter than 2048 bytes. This ensures that each packet may be implemented, as desired, via a RAM in any location where a packet buffer is needed. A single packet can carry an entire line of either Y (Luma) or C (Chroma) pixels.

In the present specific implementation, each packet generates at most 2032 bytes to be written by a packet, such as one per raster line. Each raster line may include 1024 bytes at offset 0 and 1024 bytes at offset 1024.

In the present embodiment, slightly different packet types are employed for chroma and luma data to accommodate differences in how such data is handled in the encoder of FIG. 1. Descriptions of various packet types, corresponding raster line numbers allowed in each packet, physical memory line numbers to which packet line numbers map, portions of pixels that are replicated for pixel extensions, range of packet lengths in bits during normal coding, and packet destination memory banks are illustrated in Table 1 below.

TABLE 1

| Packet Type | Legal Line No. In Packet | Maps to Physical Mem. Line No. | Pixel Replication | Range In Normal Video Coding | Destination |
|---|---|---|---|---|---|
| VID_Y_INPUT | 0–2047 (0x000–0x7FF) | 0–2047 (0x000–0x7FF) | First, last pixels | 0–1087 | Input |
| VID_C_INPUT | 0–767 (0x00–0x2FF) | 1280–2047 (0x500–0x7FF) | First, last pixel PAIR | 0–543 | Input |
| VID_Y_RECON | 0–2047 (0x000–0x7FF) | 0–2047 (0x000–0x7FF) | First, last pixels | 0–1087 | Recon. |
| VID_C_RECON | 0–767 (0x00–0x2FF) | 1280–2047 (0x500–0x7FF) | First, last pixels PAIR | 0–543 | Recon. | of the DRAM controllers 136-150 of FIG. 3. Accordingly, luma and chroma packet satisfies:

$$Y\mathrm{count} + YL\mathrm{repeat} + YR\mathrm{repeat} \leq 254,\qquad [1]$$

where Ycount represents the number of pixels in a payload divided by eight: YLrepeat represents the number of 8-byte sections of data in a left pixel extension, such as the left extension 206 of FIG. 3; and YRrepeat represents the number of 8-byte chunks in a right pixel extension, such as the right 208.

Figure 6:
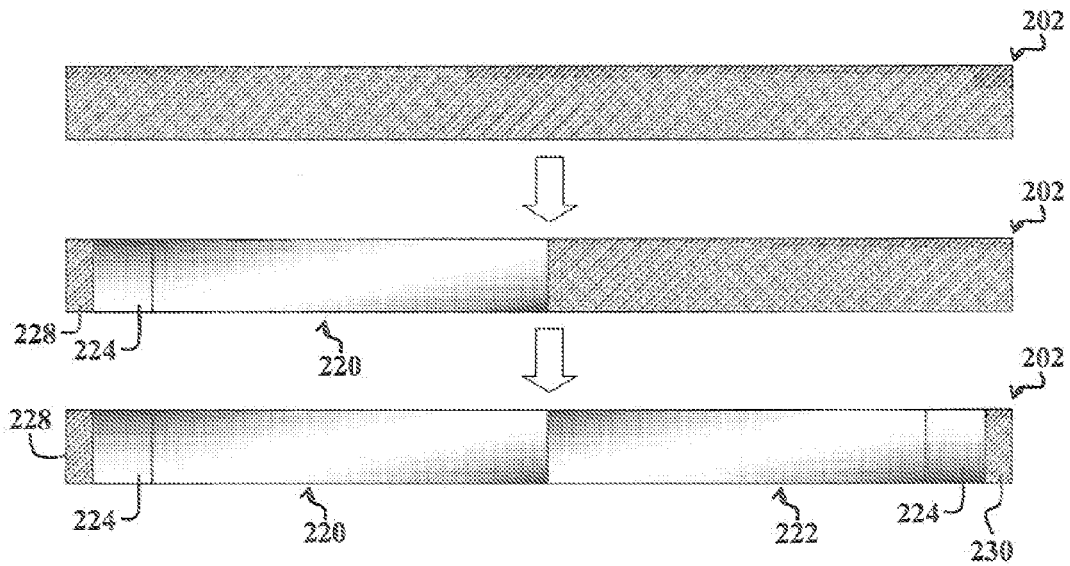
FIG. 6 is a flow diagram illustrating execution of two packets in a raster line.

FIG. 6 is a flow diagram illustrating execution of two packets 220, 222 in a raster line 202. Initially, the raster line 202 is unwritten. Subsequently, a first packet 220 with a left extension 224 is written to the raster line 202 at a predetermined offset from the left edge of the raster line 202. Next, a second packet 222 is written to the raster line 202. The second packet 222 includes a right extension 226, which is offset from the right edge of the raster line 202 by a predetermined amount. Unwritten portions 228, 230 of the raster line 202 remain to the left and right of the first packet 220 and the second, packet 222.

While in the embodiment of FIG. 6, two packets 220, 222 are executed per raster line, different numbers of packets may be executed in a given raster line without departing from the scope of the present invention. For example, the exact number of packets used to transmit a raster line is application specific. For example, packets as small as two words (8 bytes) may be used. In this case, 1920 pixels of luma would be carried in 240 packets. The first and last packets of the raster line would have packet extensions.

The video packet structure Implemented by various packets, such as the first packet 220 and second packet 222 of FIG. 6, may also carry pixel, data back from a daughtercard FPGA to an FPGA used to implement the front end 14 of the encoder 10 of FIG. 1.

In this case, such packets are adapted to signal an entire memory region and may be used for diagnostic purposes. Diagnostic frame dump data transferred to the front end 14 of FIG. 1 may include luma packets addressed to all 2047 lines of a memory module, wherein the memory includes packets Luma pixel data is stored at line addresses 0x000 through 0x4ff where hexadecimal, notation is used. The luma line-number in a packet maps directly into the physical line address.

During video operation, typically only lines 0-1087 appear. However, for diagnostic purposes, the accompanying memory writer may accept all line numbers 0-2047 to allow foil memory reading and writing. Luma pixel replication, if the luma pixels are nonzero, is only applied to the very first and the very last pixels in a given packet.

In the present embodiment, chroma pixel data is starting at physical line address 0x500 through 0x7ff. A chroma packet typically does not cause memory outside of these lines to be written. The chroma line number in the associated packet gets added to an offset of 0x500 to determine the physical raster line number to write to in memory. If the sum is greater than 2047, the packet is ignored.

The details of an example video packet structure for a luma packet and for a chroma packet are illustrated in Tables 2 and 3 below, respectively. Note that structures for luma and chroma packets are virtually identical but differ in how they are interpreted. For example, raster line offset values may differ, and pixel replication may be different for chroma versus luma packets. Furthermore, while specific examples of packets that encode video raster lines are discussed below, note that video data may be encoded in blocks, rectangles, or other shapes rather than raster lines, without departing from the scope of the present teachings. Furthermore, while separate packet types are used for chroma and luma data, a given packet type may incorporate both chroma and luma data. In general, exact packet-formats are application specific and may be changed to meet the needs of a given, implementation without departing from the scope of the present teachings. In addition, exact details, such as provided in various equations discussed below, describing how packets are stored in memory, are application specific. Other memory storage methods arid associated, details may be employed without departing from the scope of the present teachings.

TABLE 2

Video Luma Packet

| Description | Byte [31:24] | [23:16] | [15:8] | [7:0] |
|---|---|---|---|---|
| Common Header | Continuity Count | | Frame ID | Packet Type |
| | Reserved | | Packet Length | |
| Pkt. Header | Y Frame Index | YOffset | YLrepeat  YRrepeat | Ycount |
| | | | Y Line number (0–2047) | |
| Pixel Payload | Y3 | Y1 | Y1 | Y0 |
| | . | | . | |
| | . | | . | |
| | Y[Ycount * 8 − 1] | Y[Ycount * 8 − 2] | Y[Ycount * 8 − 3] | Y[Ycount * 8 − 4] |

TABLE 3

Video Chroma Packet

| Description | Byte [31:24] | [23:16] | [15:8] | [7:0] |
|---|---|---|---|---|
| Common Header | Continuity Count | | Frame ID | Packet Type |
| | Reserved | | Packet Length | |
| Pkt. Header | C Frame Index | C Offset | CLrepeat  CRrepeat | Ccount |
| | | | C Line number (0–543) | |
| Pixel Payload | Cr[1] | Cb[1] | Cr[0] | Cb[0] |
| | . | | . | |
| | . | | . | |
| | Cr[Ccount * 4 − 1] | Cb[Ccount * 4 − 1] | Cr[Ccount * 4 − 2] | Cb[Ccount * 4 − 2] |

Descriptions of certain fields in the luma and chroma packet structures of Tables 2 and 3 above are given in Table 4 below.

TABLE 4

| Field name | Description  Notes |
|---|---|
| Frame Index | Bits[7:0] are in the range 0000000–0000111 (0 through 7) and indicate the frame number associated with the packet. |
| Ycount | A function of the number of pixels in the payload section of the packet, where the number of pixels in the payload = 8 * (Ycount). This field has units of 8 bytes. |
| Yoffset | Offset (in increments of 8 bytes) at which first pixels in a raster line are written to by this packet. Pixels to the left of this offset position (bytes 0 through 8 * Yoffset − 1) in the raster line are not modified in memory by this packet. |
| YLrepeat | Number of 8-byte chunks in the left pixel extension. A YLrepeat of 0 means no left extension. |
| YRrepeat | Number of 8-byte chunks in right pixel extension |
| Ccount | A function of the number of pixels in the payload, where the number of pixels in the payload = 8 * (Ccount). Ccount has units of 8 bytes. There are 4 * Ccount Cb (blue chroma component) pixels and 4 * Ccount Cr (red chroma component) pixels. |
| Coffset | Offset (in increments of 8 bytes) at which the first pixels in the raster line are written to by this packet. Pixels to the left of this offset (bytes 0 through 8 * Coffset − 1) in the raster line are not modified in memory by this packet. |
| CLrepeat | Number of 8-byte chunks in the left pixel extension associated with this packet. A CLrepeat value of 0 means no left extension. |
| CRrepeat | Number of 8-byte chunks in the right pixel extension associated with this packet. |

The video packet formulas discussed below assume that the associated memory (either input memory bank or reconstruction memory bank) is treated as an array of 32 megabytes, indexed by byte address.

Luma video packets in the present embodiment are word aligned. The formula for the start address of a luma video packet is given in equation (2) below:

$$Ystart = 4*2^{20}*(\text{Frame Index}) + 2^{11}*(Y\text{line number}) + 8*Y\text{offset}, \quad [2]$$

where Ystart represents the start address, i.e., position in memory, of the left-most luma pixel, i.e., Y pixel in a raster line; Y line number represents the raster line number associated with the chroma packet; Frame Index represents the frame number associated with the current, frame that includes the Y packet associated raster line; and Yoffset represents the offset in a raster line specifying where in memory the luma packet begins, as described in Table 4 above.

The left-most luma pixel is repeated in the first 8*YLrepeat bytes of a luma packet, starting at Ystart, such that:

$$\text{Mem}[Y\text{start}, \ldots (Y\text{start}+8*YL\text{repeat}-1)] = Y0, \quad [3]$$

where Y0 represents the first luma pixel of the packet; Mem [address or address range] represents the value at a memory location given by address or address range; and the remaining terms are as given, above.

Note that no byte shift is implied or required in this operation, since the value Y0 still appears in the next memory byte.

The luma payload data follows in the next 8*Ycount bytes:

$$\text{Mem}[(Y\text{start}+8*Yl\text{repeat}) \ldots (Y\text{start}+8*YL\text{repeat}+8*Y\text{count}-1)] = Y(0) \ldots Y(8*Y\text{count}-1), \quad [4]$$

where the terms are as given above.

Following the payload, the right-most luma pixel (Y(8*Ycount−1)) is repeated and included in the subsequent YLrepeat words, where:

$$\text{Mem}[(Y\text{start}+8*YR\text{repeat}+8*Y\text{count}) \ldots (Y\text{start}+8*YR\text{repeat}+8*Y\text{count}+8*YR\text{repeat}-1)] = Y(8*Y\text{count}-1), \quad [5]$$

where the terms are as given above.

In chroma packets are written to and from memory similarly to luma packets, except that packet extensions are obtained by replicating a pair of bytes on both ends of the chroma payload, since each pixel uses two chroma bytes. For example:

$$C\text{start}=4*2^{20}*(\text{Frame Index})+2^{11}*(C \text{ line number})+8*C\text{offset}, \quad [6]$$

where Cstart represents the start memory address of the left-most chroma pixel; C line number represents the raster line number (based at hexadecimal 500) associated with the chroma packet; Frame index represents the frame number associated with the current frame that includes the chroma packet and associated raster line; and Coffset represents the offset in a raster line specifying where in memory the chroma packet begins, as described in Table 4 above.

The left-most chroma pixel (Cb0, Cr0) is repeated in the first 8*CLrepeat bytes starting at Cstart in accordance with the following equations:

$$\text{Mem}[C\text{start}, (C\text{start}+2), \ldots (C\text{start}+8*CL\text{repeat}-2)] = Cb0,$$

$$\text{Mem}[C\text{start}+1, C\text{start}+3, \ldots (C\text{start}+8*CL\text{repeat}-1)] = Cr0 \quad [7]$$

where the terms are as given above.

The chroma payload data follows in the next 8*Ccount bytes, as given in the following equations:

$$\text{Mem}[(C\text{start}+8*CL\text{repeat}, C\text{start}+8*Cl\text{repeat}+2) \ldots (C\text{start}+8*CL\text{repeat}+8*C\text{count}-2)] = Cb(0), Cb(1) \ldots Cb(4*C\text{count}-1),$$

$$\text{Mem}[(C\text{start}+8*CL\text{repeat}+1, C\text{start}+8*Cl\text{repeat}+3) \ldots (C\text{start}8+*CL\text{repeat}+8*C\text{count}-1)] = Cr(0), Cr(1) \ldots Cr(4*C\text{count}-1), \quad [8]$$

where the terms are as given above.

Note that these two assignments can be simplified to a simple copy of 8*Ccount contiguous pixels, followed by the right-most chroma pixel repeated in the following 8*CLrepeat bytes:

$$\text{Mem}[(C\text{start}+8*CR\text{repeat}+8*C\text{count}, C\text{start}+8*CR\text{repeat}+8*C\text{count}+2) \ldots (C\text{start}+8*CR\text{repeat}+8*C\text{count}+8*CR\text{repeat}-2)] = Cb(4*C\text{count}-1),$$

$$\text{Mem}[(C\text{start}+8*CR\text{repeat}+8*C\text{count}+1, C\text{start}+8*CR\text{repeat}+8*C\text{count}+3) \ldots (C\text{start}+8*CR\text{repeat}+8*C\text{count}+8*CR\text{repeat}-1)] = Cr(4*C\text{count}-1), \quad [9]$$

where the terms are as given above.

While certain embodiments have been described herein, wherein certain modules are adapted to transmit and receive data, certain specific details are omitted. However, such details may be readily implemented by those skilled in the art to construct an embodiment described, herein without undue experimentation.

Certain modules that may be useful in implementing certain embodiments disclosed here include a Common. Video Input Packet Writer (CVIPC), a Common Video Reader (CVR), and a Common Video Packet Generator (CVPG). Such modules may be readily obtained or built by those skilled in the art with access to the present teachings.

A CVIPC generally parses and executes common video line packets. These packets may contain pixel, replication controls in addition to the page number and raster line number to which, the packet payload is to be stored. A CVIPC may interface to a port on a Common Memory Arbiter (CMA) and employ the common video memory map discussed herein to translate fields in the packet to physical memory locations.

FPGAs employed in the present embodiments may employ a first CVIPC for input packets. The first CVIPC communicates with a 32-bit CMA, which is also called a DRAM controller herein. See, for example, the DRAM controllers 136-142 of FIG. 3. A second CVIPC may be employed for reconstructed packets. The second CVIPC may communicate, with a 64-bit CMA, such as the DRAM controllers 144-150 of FIG. 3.

A CVR reads video raster lines from a video memory map according to its control fields, such as line pitch, page number, starting raster line number, and so on. The CVR may interlace to a port on a CMA to read data. Outputs of the CVR may drive a CVPG or internal processing engine.

A CVPG may receive data lines produced by the CVR and a set of control fields (which may be provided via a microprocessor register interface) as input. The CVPG generates video raster line packets for transmission to chip-to-chip interfaces. The CVPG may be included in various modules, such as the front end 14 of FIG. 1 to facilitate constructing an input video packet stream, and also in the loop filter 58 of FIG. 1 to transmit the reconstructed video packet stream 64 to the broadcast module 20 and to the display controller 68.

Although embodiments of the invention are discussed primarily with respect to an H.264-compliant encoder, embodiments of me present invention may be adapted to any video encoder wherein parallel engines or a pipelined engine may be useful to process macroblocks in a frame. Furthermore, any acceptable architecture, topology, protocols, or other network and digital processing features can be employed. In general, certain modules and components discussed herein can be implemented in hardware, software, or via any device with processing ability or other requisite functionality. Techniques described herein may be suitable for use with other types of information processing. For example, the processing can operate on previously compressed or encoded image information, on three-dimensional image data, on non-visual information, etc.

Although specific processing sequences have been provided for processing data such as macroblocks, sub-blocks, slices, etc., any other suitable processing order or approach may be used. For example, any number of contiguous macroblocks may be in a slice. A slice can be a horizontal, band but can also span horizontal bands, or be oriented vertically, diagonally, or in other non-horizontal directions.

Arrowheads shown on signal paths between various modules are for illustrative purposes only. For example, various communication paths or connecting lines, which appear to be unidirectional in the drawings, may be bidirectional without departing from the scope of the present invention.

Although processes of the present invention and the hardware executing the processes may be characterized by language common to a discussion of video processing (e.g., "FPGA," "CABAC," etc.), it should be apparent that operations of an embodiment of the present invention can execute on any type of suitable hardware in any communication relationship to another: device on any type of link or network.

Although a process of the present invention may be presented as a single entity, such as software or hardware executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a transformation program and a quantization program, can he executing in a single module, or in different modules.

Although the Invention has been discussed with respect- to specific example embodiments thereof, these embodiments are merely illustrative, and not restrictive, of the invention. In the description herein, numerous specific details are provided, such as examples of components and/or methods, to provide a thorough understanding of discussed example embodiments. One skilled in the relevant art will recognize, however, that certain embodiments can be practiced without one or more of the specific details, or with other apparatus, systems, assemblies, methods, components, materials, parts, and/or the like. In other instances, well-known structures, materials, or operations are not specifically shown, or described in detail to avoid obscuring aspects of the example embodiments discussed herein.

A "machine-readable medium" or "computer-readable medium" may be any medium that can contain, store, communicate, propagate, or transport the program for use by or in connection with the Instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" Includes any human, hardware and/or software system, mechanism or component that processes data, signals or other information. A processor can include a system with a general-purpose central processing unit, multiple processing units, dedicated circuitry for achieving functionality, or other systems. Processing need not he limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment not necessarily included in all possible example embodiments.

Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment or example embodiment discussed herein may be combined in any suitable manner with one or more other embodiments. It is to be understood that other variations and modifications of the embodiments described and illustrated herein are possible in light of the teachings herein, and the variations are to be considered as part of the spirit and scope of the present invention.

Example embodiments discussed herein may be implemented in whole or in part by using a programmed general purpose digital computer; by using application specific integrated circuits, programmable logic devices, FPGAs, optical, chemical, biological, quantum or nanoengineered systems or mechanisms; and so on. In general, the functions of various embodiments can be achieved by any means as is known in the art. Distributed or networked systems, components, and/or circuits can be used. Communication, or transfer of data may be wired, wireless, or by airy other means.

It will also be appreciated that one or more of the elements depicted in the drawings/FIGS. can also be implemented In a more separated of integrated manner, or even removed or rendered as inoperable in certain cases, as is useful in accordance with a particular application. It is also within the spirit and scope of the present invention to implement a program or code that can be stored in a machine-readable medium, to permit a computer to perform any of the methods described above.

As used in the description herein and throughout the claims that follow "a", "an", and "the" include plural references unless the context clearly dictates otherwise. Furthermore, as used In the description herein and throughout the claims that follow, the meaning of "in" includes "in" and "on" unless the context clearly dictates otherwise.

The foregoing description of illustrated example embodiments, including what is described in the Abstract, is not intended to be exhaustive or to limit the Invention to the precise forms disclosed herein. While certain example embodiments are described herein for illustrative purposes only, various equivalent modifications are possible within the spirit and scope of the present invention, as those skilled In the relevant art will recognize and appreciate. As indicated, these modifications may be made in light of the foregoing description of illustrated example embodiments and are to be included within the spirit and scope of the present invention.

Thus, while example embodiments have been described herein, a latitude of modification, various changes and substitutions are intended in the foregoing disclosures, and it will be appreciated that in some instances some features of embodiments will be employed without a corresponding use of other features without departing from the scope and spirit of the invention. Therefore, many modifications may be made to adapt a particular situation or material to the essential scope and spirit of the present invention. It is intended that the invention not be limited to the particular terms used in following claims and/or to a particular embodiment disclosed as the best mode contemplated for carrying out this invention, but that the invention will include any and all embodiments and equivalents falling within the scope of the appended claims.

What is claimed is:

1. A video-processing apparatus comprising:
a central memory configured to receive and store video information, the video information comprising input video data and reconstructed pixel information; and
a processor operative to execute:
a first set of software modules operative to accommodate functional traffic flowing between each module thereof, each module comprising a local memory wherein the first set of software modules includes a chroma reconstruction module, the chroma reconstruction module having instructions for performing intra prediction for chrominance;
a broadcast software module adapted to broadcast a portion of the video information from the central memory to the local memory of at least one of the first set of software modules, wherein the at least one of the first set of software module is configured to select the needed video information from the portion of the video information and replicate the selected video information on the local memory; and
an entropy-coding software module coupled to the broadcast software module, the entropy-coding software module operative to provide feedback to at least one software module from the first set of software modules and the broadcast software module.

2. The video-processing apparatus of claim 1, wherein the first set of software modules and the broadcast software module are configured to facilitate isolation of video traffic from functional traffic.

3. The video-processing apparatus of claim 1, further comprising: a processing engine for receiving functional data pertaining to the functional traffic and performing an operation on the selected video information based on the functional data.

4. The video-processing apparatus of claim 1, wherein the first set of software modules further comprises: a similar packet definition for packets of video data pertaining to the video traffic.

5. A video encoder apparatus comprising:
a processor operative to execute a plurality of hardware modules, each of the plurality of hardware modules including:
a local memory; and
a local engine in communication with the local memory;
a central memory configured to receive and store video information, the video information comprising input video data and reconstructed pixel information, the central memory coupled to each local memory such that each local memory replicates a portion of the video information, wherein the plurality of hardware modules are configured to select needed video information from the portion of the video information and replicate the selected video information on the local memory, wherein the video information comprises luma pixel data and chroma pixel data, the luma pixel data and the chroma pixel being partitioned in a raster line; and
an entropy-coding software module coupled to at least one of the plurality of hardware modules and operative to provide feedback the at least one of the plurality of hardware modules.

6. The video encoder apparatus of claim 5, further including a broadcasting module operative to broadcast the portion of video information from the central memory to each local memory.

7. The video encoder apparatus of claim 5, further including a module operative to provide functional information to each local engine.

8. The video encoder apparatus of claim 7, wherein the module operative to provide functional information includes: each local engine, which is adapted to provide functional information to or receive functional information from another local engine.

9. A video processing apparatus comprising:
a first hardware module adapted to perform a first predetermined function, wherein the first hardware module includes: a first memory;
a second hardware module adapted to perform a second predetermined function, wherein the second hardware module includes: a second memory;
a broadcast hardware module adapted to broadcast a portion of video to the first memory and the second memory, wherein the video information comprises input video frames and reconstructed video frames, and wherein the first hardware module and the second hardware module are configured to select needed video information from the portion of the video information and replicate the selected video information on the first memory and the second memory, wherein the video information comprises luma pixel data and chroma pixel data, the luma pixel data and the chroma pixel being partitioned in a raster line; and
an entropy-coding software module couple to the broadcast module, the entropy-coding module configured to provide feedback to the broadcast module.

10. The video processing apparatus of claim 9, wherein the second hardware module includes: inputs for receipt of coding data from the first module.

11. The video processing apparatus of claim 9, wherein the first predetermined function includes motion search.

12. The video processing apparatus of claim 11, wherein the second predetermined function includes: mode decision.

13. The video processing apparatus of claim 11, wherein the second predetermined function includes: motion compensation.

14. The video processing apparatus of claim 11, wherein the second predetermined function includes: pixel reconstruction.

15. The video processing apparatus of claim 11, wherein the second predetermined function includes: loop filtering.

16. The video processing apparatus of claim 9, wherein an architecture of the first hardware module is employed by the second hardware module.

17. The video processing apparatus of claim 16, wherein the first memory and the second memory are local memory.

18. The video processing apparatus of claim 9, wherein the first hardware module further includes: at least one engine in communication with the first memory, wherein the at least one engine is adapted to receive at least one functional input and to provide at least one functional output.

19. The video processing apparatus of claim 9, wherein the first memory includes: a first memory bank and a second memory bank.

20. The video processing apparatus of claim 19, wherein the first memory bank is adapted to store input video frames.

21. The video processing apparatus of claim 19, wherein the second memory bank is adapted to store reconstructed video frames.

22. A video-processing apparatus comprising:
a plurality of modules each comprising a local memory;
first means for separating traffic flowing to at least one of the plurality of modules into a first portion of traffic and a second portion of traffic; and
second means for broadcasting the second portion of traffic to the at least one of the plurality of modules, the second means for broadcasting the second portion of traffic operative to broadcast a portion of video information from a central memory to the local memory of the at least one of the plurality of modules, wherein the at least one of the plurality of module is configured to select needed video information from the portion of the video information and replicate the selected video information on the local memory, the video information comprising packets, wherein each packet includes a payload of pixel data positioned between a left extension and a right extension.

23. The apparatus of claim 22, wherein the first portion of traffic includes: coding traffic.

24. The apparatus of claim 23, wherein the plural modules are coupled so that certain coding traffic flows between the plural modules.

25. The apparatus of claim 24, wherein the plural modules include:
module-search modules.

26. The apparatus of claim 24, wherein the plural modules include:
intra-prediction modules.

27. The apparatus of claim 22, wherein the first means includes: a front-end module and a control module.

28. The video-processing apparatus of claim 1, the local memory comprises a first partition adapted to store input video data and a second partition adapted to store reconstructed pixel information.

29. The video-processing apparatus of claim 1, wherein the video information is mapped to the local memory using a memory map, wherein each frame is allocated four megabytes of memory space.

30. The video-processing apparatus of claim 1, wherein the video information comprises luma pixel data and chroma pixel data, the luma pixel data and the chroma pixel partitioned in a raster line.

31. The video-processing apparatus of claim 30, wherein a length of the raster line is 2048 byte.

32. The video-processing apparatus of claim 1, wherein the video information comprises packets, wherein each packet includes a payload of pixel data positioned between a left extension and a right extension.

33. The video-processing apparatus of claim 32, wherein the packet further comprises a left portion and a right portion, wherein the left portion and the right portion representing pixel memory space that was not written when the packet was executed.

34. The video-processing apparatus of claim 32, wherein the left extension comprises a portion of the pixel data that includes a repeated version of the leftmost portion of the pixel payload.

35. The video-processing apparatus of claim 32, wherein the right extension comprises a portion of the pixel data that includes a repeated version of the rightmost portion of the pixel payload.

36. The video-processing apparatus of claim 22, wherein the video information comprises luma pixel data and chroma pixel data, the luma pixel data and the chroma pixel partitioned in a raster line.

* * * * *